United States Patent
Fischer et al.

(10) Patent No.: US 9,391,973 B2
(45) Date of Patent: Jul. 12, 2016

(54) INTEGRATION OF CENTRALIZED AND LOCAL AUTHORIZATIONS FOR MULTI-DIMENSIONAL DATA

(71) Applicants: Uwe E. Fischer, Karlsruhe (DE); Christoph Lenschow, Nussloch (DE)

(72) Inventors: Uwe E. Fischer, Karlsruhe (DE); Christoph Lenschow, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/572,054

(22) Filed: Dec. 16, 2014

(65) Prior Publication Data

US 2016/0173468 A1 Jun. 16, 2016

(51) Int. Cl.
*H04L 29/06* (2006.01)
*G06F 21/60* (2013.01)

(52) U.S. Cl.
CPC .............. *H04L 63/08* (2013.01); *G06F 21/604* (2013.01)

(58) Field of Classification Search
CPC ....................................................... H04L 63/08
USPC ............................................................ 726/6
See application file for complete search history.

(56) References Cited

U.S. PATENT DOCUMENTS

| | | | |
|---|---|---|---|
| 7,290,018 B2 | 10/2007 | Muecklich et al. | |
| 7,536,427 B2 | 5/2009 | Fischer et al. | |
| 7,783,667 B2 | 8/2010 | Scheerer et al. | |
| 7,836,357 B2 | 11/2010 | Fischer et al. | |
| 7,853,616 B2 | 12/2010 | Buchmann et al. | |
| 7,856,507 B2 | 12/2010 | Fischer et al. | |
| 7,890,475 B2 | 2/2011 | Demuth et al. | |
| 7,930,404 B2 | 4/2011 | Ferro et al. | |
| 8,010,376 B2 | 8/2011 | Buchmann et al. | |
| 8,099,431 B2 | 1/2012 | Buchmann et al. | |
| 8,335,215 B2 | 12/2012 | Fischer | |
| 8,600,960 B2 | 12/2013 | Fischer et al. | |
| 8,880,458 B2 | 11/2014 | Weber et al. | |
| 8,886,590 B2 | 11/2014 | Fischer | |
| 2004/0015579 A1* | 1/2004 | Cooper | H04L 12/2602 709/223 |
| 2007/0118572 A1 | 5/2007 | Fischer et al. | |
| 2009/0210465 A1 | 8/2009 | Fischer et al. | |
| 2014/0136470 A1 | 5/2014 | Weber et al. | |

* cited by examiner

*Primary Examiner* — Longbit Chai
(74) *Attorney, Agent, or Firm* — Fish & Richardson P.C.

(57) ABSTRACT

The present disclosure describes methods, systems, and computer program products for integrating authorizations. One computer-implemented method includes: reading enterprise data warehouse (EDW) authorizations for a user from an authorization database in response to a query generated by the user for EDW data; responsive to a determination that the user is assigned to an environment, reading environment authorizations from a business planning and consolidation (BPC) system; enhancing the EDW authorizations for the user with the environment authorizations read from the BPC system to create a new authorization set; reading a user-based data access profile (DAP) from the BPC; and intersecting the new authorization set with the DAP to create an overall user authorization set.

20 Claims, 7 Drawing Sheets

Data Warehouse Authorizations:

404 {
| Dimension | Value | |
|---|---|---|
| Customer | 1,2,3 | 408 |
| Country | DE | 410 |

406 {
| Dimension | Value | |
|---|---|---|
| Customer | 4 | 412 |
| Country | FR | 414 |

FIG. 4A

Environment Authorizations:

416 {
| Dimension | Value | |
|---|---|---|
| Customer | 1, 2 | 418 |
| Country | FR | 420 |

FIG. 4B

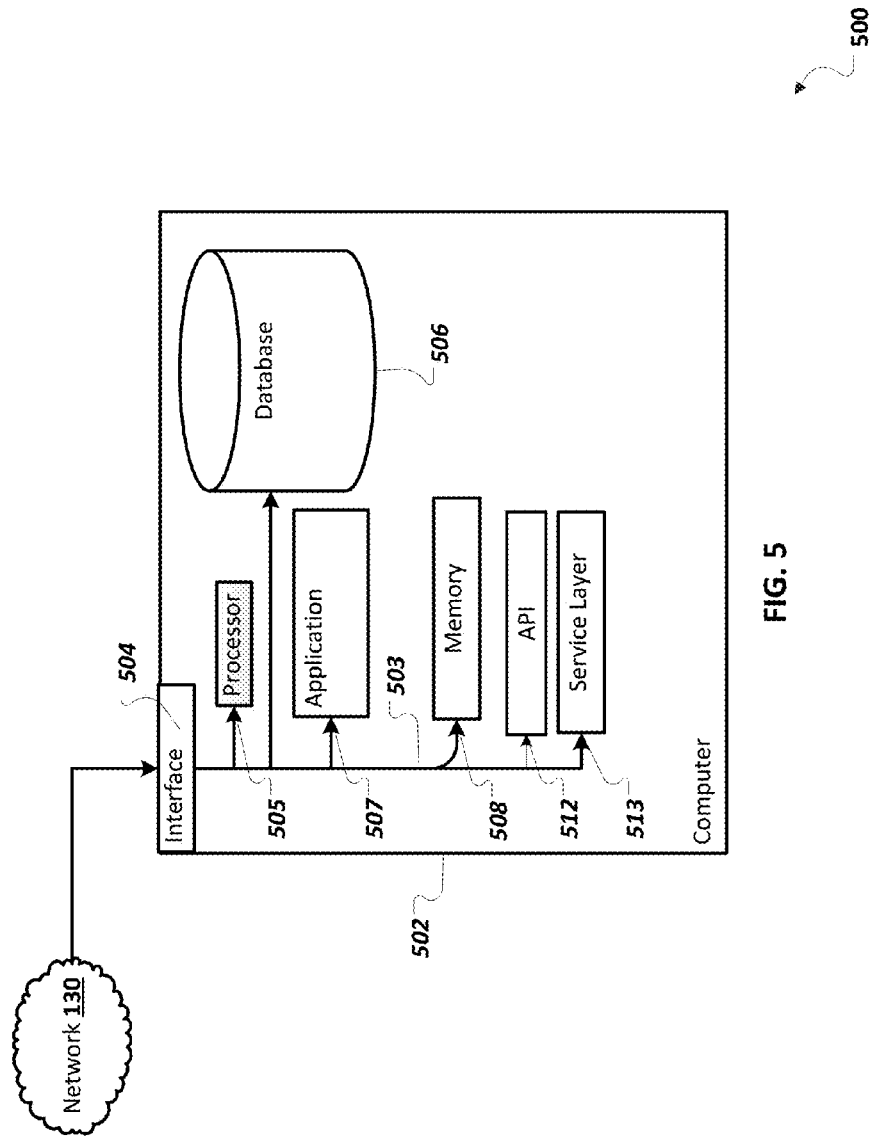

INTEGRATION OF CENTRALIZED AND LOCAL AUTHORIZATIONS FOR MULTI-DIMENSIONAL DATA

TECHNICAL FIELD

The present disclosure relates to computer-implemented methods, software, and systems for integrating authorizations.

BACKGROUND

A data warehouse is a central repository that includes data from multiple sources. The data warehouse can include both current and historical data. An organization can use the data warehouse for reporting and analysis. Various users may be authorized to use the data warehouse. A user authorization may grant a given user access to one or more sets of data within the data warehouse. The user authorization can indicate actions that the user is allowed to perform, such as viewing, updating, and/or deleting data.

SUMMARY

The present disclosure involves systems, software, and computer implemented methods for integrating authorizations. One computer-implemented method includes: reading enterprise data warehouse (EDW) authorizations for a user from an authorization database in response to a query generated by the user for EDW data; responsive to a determination that the user is assigned to an environment, reading environment authorizations from a business planning and consolidation (BPC) system; enhancing the EDW authorizations for the user with the environment authorizations read from the BPC system to create a new authorization set; reading a user-based data access profile (DAP) from the BPC; and intersecting the new authorization set with the DAP to create an overall user authorization set.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising receiving a request to fill an authentication buffer in response to the query.

A second aspect, combinable with any of the previous aspects, wherein enhancing the EDW authorizations for the user comprises a union of the EDW authorizations and the environment authorizations.

A third aspect, combinable with any of the previous aspects, comprising performing an authority check for the user with respect to the query using the overall user authorization set.

A fourth aspect, combinable with any of the previous aspects, wherein the EDW and environment authorizations are established by a centralized information technology group.

A fifth aspect, combinable with any of the previous aspects, wherein the DAPs are established by a local information technology group for a particular line-of-business.

A sixth aspect, combinable with any of the previous aspects, wherein the DAPs restrict the new authorization set.

The subject matter described in this specification can be implemented in particular implementations so as to realize one or more of the following advantages. A centralized IT department can define a frame of data warehouse authorizations that are applicable to multiple lines of business. A local IT department that handles IT needs for a particular line of business can define authorizations for users of the line of business that make sense for the line of business and that adhere to the frame of data warehouse authorizations defined by the centralized IT department. The centralized IT department does not need to be involved with specific customizations of authorizations that are applicable to a particular line of business. The local IT department can configure authorizations directly without waiting for a response from the centralized IT department.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4A is a diagram illustrating data warehouse authorizations according to an implementation.

FIG. 4B is a diagram illustrating environment authorizations according to an implementation.

FIG. 5 is a block diagram of an exemplary computer used in the EDCS according to an implementation.

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

A centralized IT (Information Technology) department (central IT) of an enterprise can define enterprise data warehouse (EDW) authorizations for an enterprise data warehouse and assign users to the EDW authorizations. The enterprise may have multiple lines of business, with each line of business having different IT needs. Each line of business can have a local IT department. The central IT department of a line of business can define a set of environment authorizations that are specific to an environment used by the line of business and that are to be applied to a user associated with the line of business. The local IT can assign users to the environment and can define user-based data access profiles (DAPs) and assign users to the DAPs. Distributing authorization definition tasks between central IT and the local IT department can result in time savings for both central IT and the line of business, since the line of business does not have to submit requests to central IT and wait for those requests to be fulfilled. In response to a query from the user for EDW data, an overall authorization set can be created from the EDW authorizations, the environment authorizations and the DAP.

Figure 1:
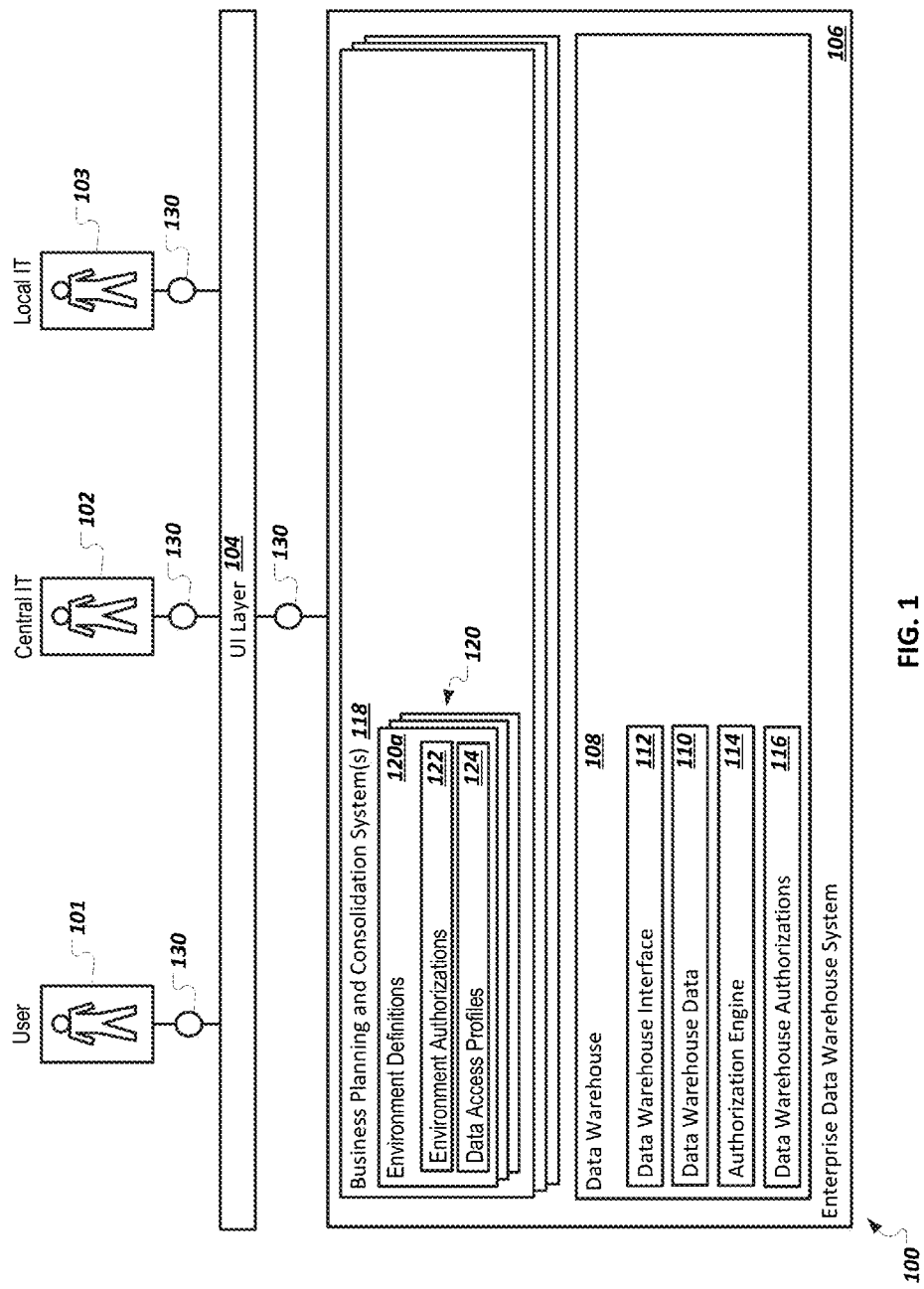
FIG. 1 is a high-level block diagram of an example distributed computing system (EDCS) for integrating authorizations according to an implementation.

FIG. 1 is a high-level architecture block diagram illustrating an example distributed computing system (EDCS) 100 for integrating authorizations according to an implementation. At a high level, the illustrated EDCS 100 includes or is made up of one or more communicably coupled computers (see FIG. 5) that communicate across a network 130 operating within an enterprise computing environment. Although there are only four indicated instances of network 130, one or more other illustrated connections between components of the EDCS 100 can also be considered part of network 130. The illustrated EDCS 100 includes a data warehouse user 101, a central IT user 102, a local IT user 103, a UI layer 104, and an enterprise data warehouse (EDW) system 106.

The EDW system 106 manages an enterprise data warehouse 108, which includes data warehouse data 110. A data warehouse interface 112 component can provide an interface to the data warehouse 108 to the data warehouse user 101, in the UI layer 104. The data warehouse user 101 can submit a query for data warehouse data 110 to the data warehouse 108, using the UI layer 104.

An authorization engine 114 can determine whether the data warehouse user 101 is authorized to access the data associated with the submitted query. For example, the authorization engine 114 can query EDW authorizations 116. The EDW authorizations 116 can be authorizations that have been defined and assigned to the data warehouse user 101 by the central IT user 102. When the authorization engine 114 determines that the data warehouse user 101 is authorized to access the data associated with the query, the data warehouse 108 can perform the query and return query results to the data warehouse user 101. When the authorization engine 114 determines that the data warehouse user 101 is not authorized to access the data associated with the query, the query is not performed, and the data warehouse interface 112 can return an error message to the data warehouse user 101.

The EDW system 106 can serve an enterprise which has multiple lines of business. Each line of business can have different IT needs. A Business Planning and Consolidation (BPC) system 118 can be used to define software environments (e.g., workspaces) that can be used by users in respective lines of business (although illustrated as being included in the EDW system 106, in some implementations, the BPC system 118 is separate from the EDW system 106). The central IT user 101, for example, can define a set of environment definitions 120 with each environment definition 120 corresponding to a respective line of business. For example, an environment definition 120a can correspond to a first line of business associated with the local IT user 103. In some implementations, the local IT user 103 defines the environment definition 120a.

The environment definition 120a includes a set of environment authorizations 122 which are specific to the first line of business. The environment authorizations 122 can be defined by the central IT user 102. The environment authorizations 122 can be more restrictive or broader than the EDW authorizations 116. In other words, the EDW authorizations 116 can provide a frame within which the environment authorizations 122 reside. For example, if the EDW authorizations 116 do not provide access to certain data, the environment authorizations 122 cannot override the EDW authorizations 116 to provide access to the certain data.

The local IT user 103 can assign the data warehouse user 101 to the environment associated with the environment definition 120a (e.g., if the data warehouse user 101 is associated with the first line of business). The local IT user 103 can define a user-based data access profile (DAP) 124 that is specific to the data warehouse user 101 and can assign the data warehouse user 101 to the data access profile 124. The data access profile 124 can be more restrictive but not broader than the environment authorizations 122 and the EDW authorizations 115.

The assigning by the local IT user 103 of the data warehouse user 101 to the environment associated with the environment definition 120a and to the user-based DAP 124 can be performed more quickly as compared to such assigning being performed by the central IT user 102. For example, the local IT user 103 does not have to submit a request to the central IT and wait for the request to be processed. The offloading of tasks to the local IT department frees central IT resources for work on other tasks.

The environment definition 120a can define a context of access for the data warehouse 108. When the data warehouse user 101 uses the context, the environment authorizations 122 are applied. The environment authorizations 122 do not affect authorizations of environments defined by environment definitions 120 other than the environment definition 120a. However, the EDW authorizations 116 are applicable in any context. The authorization engine 114 can integrate various authorizations in response to a data access request, based on a context from which the request is generated.

For example, in response to a query from the data warehouse user 101 for data warehouse data 110, the authorization engine 114 can read the EDW authorizations 116. The authorization engine 114 can read the environment authorizations 122 from the BPC system 118 in response to determining that the data warehouse user 101 is assigned to the environment associated with the environment definition 120a. The authorization engine 114 can enhance the EDW authorizations 116 for the data warehouse user 101 with the environment authorizations 122 to create a new authorization set. The authorization engine 114 can read the user-based DAP 124 from the BPC system 118 and intersect the new authorization set with the user-based DAP 124 to create an overall user authorization set for the data warehouse user 101. The authorization engine 114 can use the overall user authorization set to determine whether the query can be performed for the data warehouse user 101. Enhancing and intersecting are described in more detail below.

Figure 2:
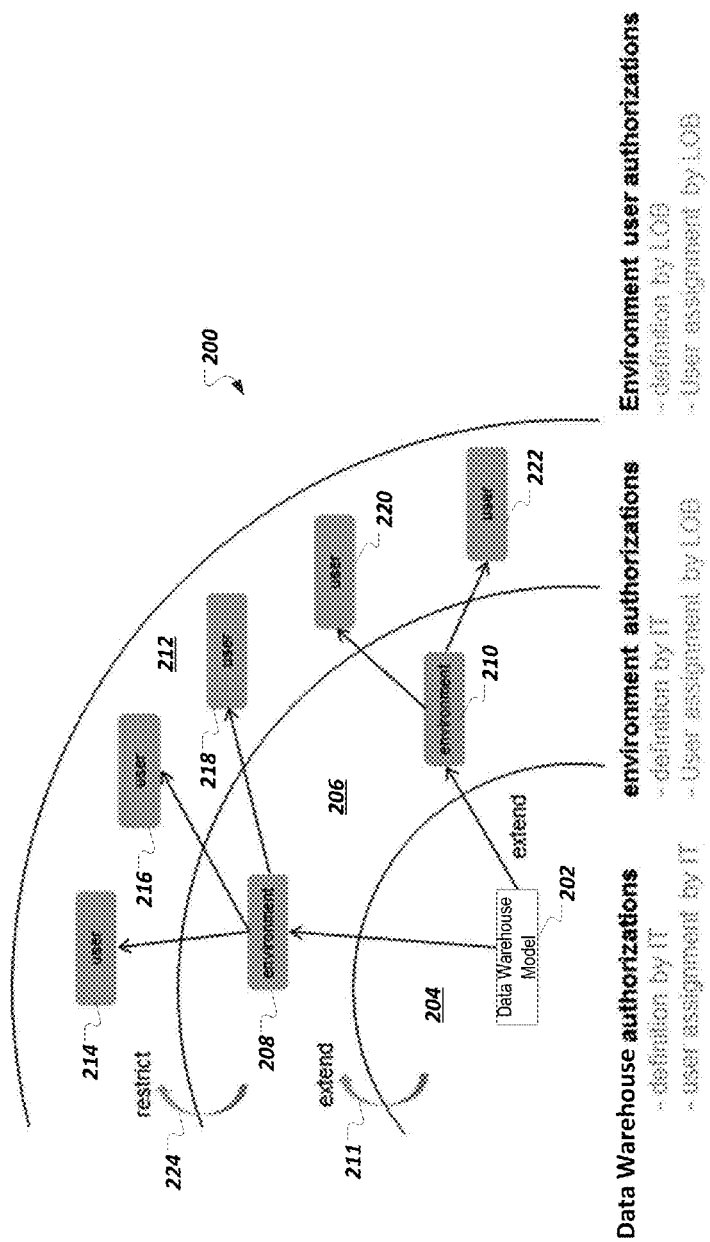
FIG. 2 is a diagram illustrating integration of authorizations for a data warehouse model according to an implementation.

FIG. 2 is a diagram 200 illustrating integration of authorizations for a data warehouse model 202 according to an implementation. An innermost circle 204 of the diagram 200 illustrates EDW authorizations that are defined by a central IT department. The central IT department can assign the EDW authorizations to users, such as users who work on a backend data warehouse system.

A middle circle 206 of the diagram 200 represents environment authorizations for environments that are each associated with a line of business (LOB). For example, a first set of environment authorizations 208 can be defined (e.g., by central IT) for a first environment and a second set of environment authorizations 210 can be defined for a second environment. A local IT department that is associated with a first LOB and with the first environment can assign the environment authorizations 208 to a first user associated with the first LOB. An overall authorization set can be generated for the first user by extending the EDW authorizations using the environment authorizations 208. For example, the overall authorization set for the first user can be generated using a union of the EDW authorizations and the environment authorizations 208 (e.g., with an arrow 211 representing the union/extension). A local IT department that is associated with a second LOB and with the second environment can assign the environment authorizations 210 to a second user associated with the second LOB. An overall authorization set can be generated for the second user by extending the EDW authorizations using the environment authorizations 210.

The first LOB and the second LOB can define one or more environment user authorizations that are each specific to a user of a respective environment. Environment user authorizations are illustrated in an outermost circle 212 of the diagram 200. For example, the first LOB can define environment user authorizations 214, 216, and 218 for third, fourth, and fifth users, respectively and the second LOB can define environment user authorizations 220 and 222 for sixth and seventh users, respectively. An overall authorization set, for example, for the third, fourth, or fifth user can be generated by integrating the EDW authorizations, the environment authorizations 208, and one of the environment user authorizations 214, 216, or 218, respectively. For example, an overall authorization set for the third user can be generated by performing a union of the EDW authorizations and the environment authorizations 208 to create an intermediate authorization set, and performing an intersection (e.g., restriction) of the intermediate authorization set with the environment user authorizations 214 (e.g., with the intersection being represented by an arrow 224). Similarly, an overall authorization set for the sixth or seventh users can be generated by integrating the EDW authorizations, the environment authorizations 210, and one of the environment user authorizations 220 or 222, respectively.

Figure 3:
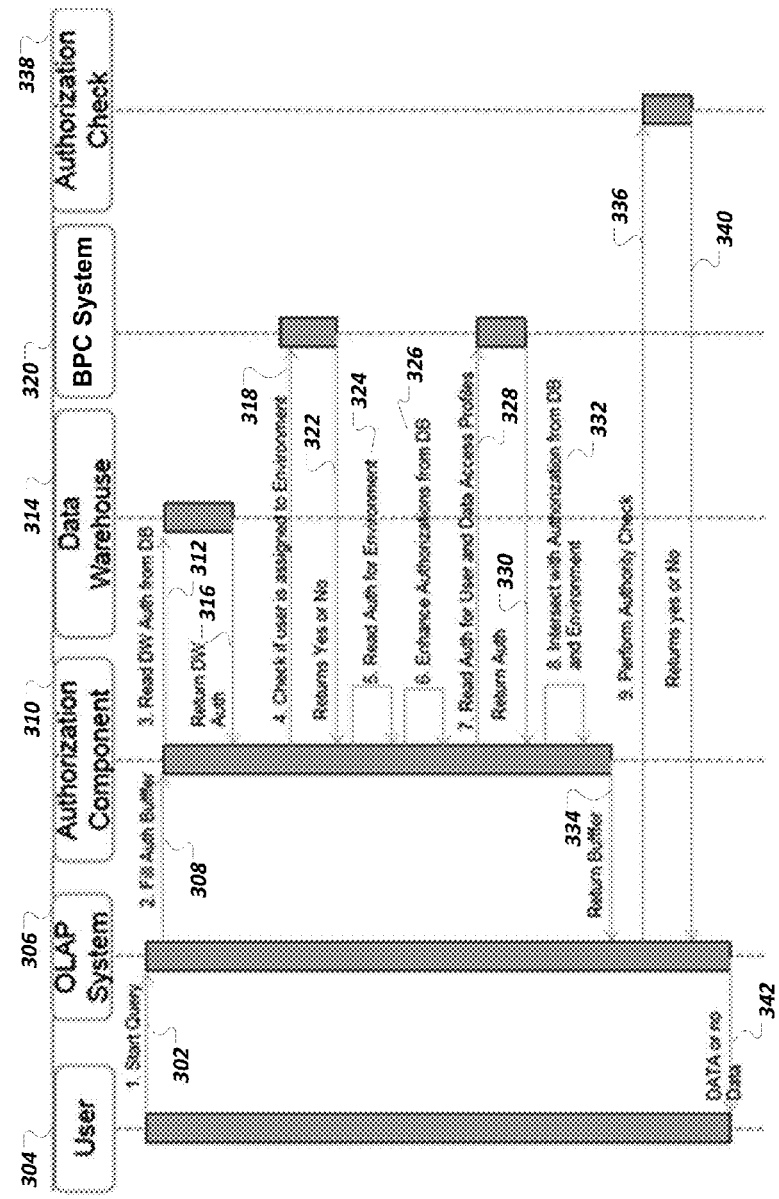
FIG. 3 represents a sequence diagram of a method illustrating integration of authorizations according to an implementation.

FIG. 3 represents a sequence diagram of a method 300 illustrating integration of authorizations according to an implementation. For clarity of presentation, the description that follows generally describes method 300 in the context of FIGS. 1 and 5. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

At 302, a user device 304 associated with a user provides a query to an OLAP (On-Line Analytical Processing) system 306 for EDW data. At 308, the OLAP system 306 sends a request to an authorization component 310 to fill an authorization buffer associated with the query.

At 312, the authorization component 310 sends a request for EDW authorizations for the user to a data warehouse 314. The EDW authorizations may previously have been established by a centralized IT group, for example. At 316, the requested EDW authorizations are provided to the authorization component 310. The EDW authorizations may, for example, specify one or more data dimensions and one or more values for each specified data dimension.

FIG. 4A is a diagram illustrating data warehouse authorizations according to an implementation. FIG. 4A, for example, illustrates example EDW authorizations 404 and 406. The EDW authorization 404 specifies customer number values of one, two, and three 408 for a customer dimension and a country value of "DE" 410 for a country dimension. The EDW authorization 406 specifies a customer number value of four 412 for the customer dimension and a country value of "FR" 414 for the country dimension. The EDW authorizations 404 and 406 specify data values that a user is authorized to view or otherwise access.

Referring again to FIG. 3, at 318, the authorization component 310 queries a BPC system 320 to determine whether the user associated with the user device 304 is assigned to an environment. At 322, the BPC system 320 responds as to whether the user is assigned to an environment. When the user is assigned to an environment, the authorization component 310, at 324, reads environment authorizations for the environment. The environment authorizations may, for example, specify one or more data dimensions and one or more values for each specified data dimension. For example, FIG. 4B is a diagram illustrating environment authorizations according to an implementation. As shown in FIG. 4B, an environment authorization 416 specifies customer number values of one and two 418 for a customer dimension and a country value of "FR" 420 for a country dimension.

Referring again to FIG. 3, at 326, the authorization component 310 enhances the EDW authorizations received from the data warehouse 314 with the environment authorizations to create a new (e.g., enhanced) authorization set. The enhancing can include determining a union of the EDW authorizations and the environment authorizations.

Figure 4C:
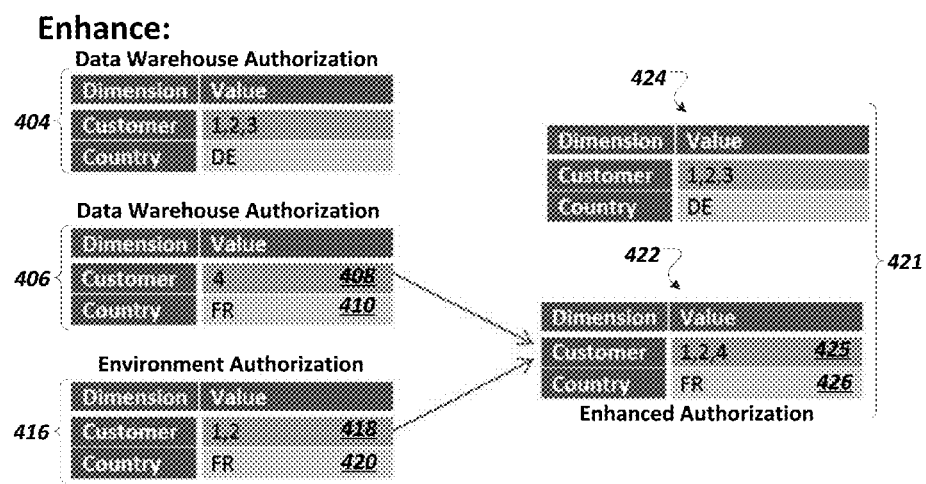
FIG. 4C is a diagram illustrating the enhancing of data warehouse authorizations with environment authorizations according to an implementation.

FIG. 4C is a diagram illustrating the enhancing of data warehouse authorizations with environment authorizations according to an implementation. FIG. 4C, for example, illustrates the union of the EDW authorizations 404 and 406 with the environment authorization 416 to generate an enhanced authorization set 421 which includes a merged authorization 422 and an authorization 424 which includes the same authorization as the EDW authorization 404. The merged authorization 422 is a merging of the EDW authorization 406 with the environment authorization 416. Merging can be performed for efficiency reasons, for example. For instance, subsequent processing of one merged authorization 422 rather than two authorizations may be more efficient.

The merged authorization 422 specifies customer number values of one, two, and four 425 for the customer dimension and a value of "FR" 426 for the country dimension. The customer number values 425 are the union of the customer number value 408 from the EDW authorization 406 and the customer number values 418 from the environment authorization 416. The country value 426 is the same as the country value 410 in the EDW authorization 406 and the country value 420 in the environment authorization 416

In some implementations, merging is performed when an EDW authorization and an environment authorization have the same dimensions and have the same values for corresponding dimensions except for one dimension that has different values between the EDW authorization and the environment authorization. For example, the EDW authorization 406 and the environment authorization 418 both have customer and country dimensions, include the same value (e.g., "FR") for the country dimension, and include different values (e.g., "4", and "1,2", respectively) for the customer dimension. The EDW authorization 404 and the environment authorization 416 have different values for both the customer and country dimensions, so merging is not performed for the EDW authorization 404 and the environment authorization 416.

Referring again to FIG. 3, at 328, the authorization component 310 queries the BPC system for a user-based data access profile for the user. At 330, the BPC system 320 provides the data access profile to the authorization component 310.

At 332, the authorization component 310 intersects the enhanced authorization set with the data access profile to create an overall user authorization set. The overall authorization set is provided, at 334, to the OLAP system 306, as an authorization buffer.

Figure 4D:
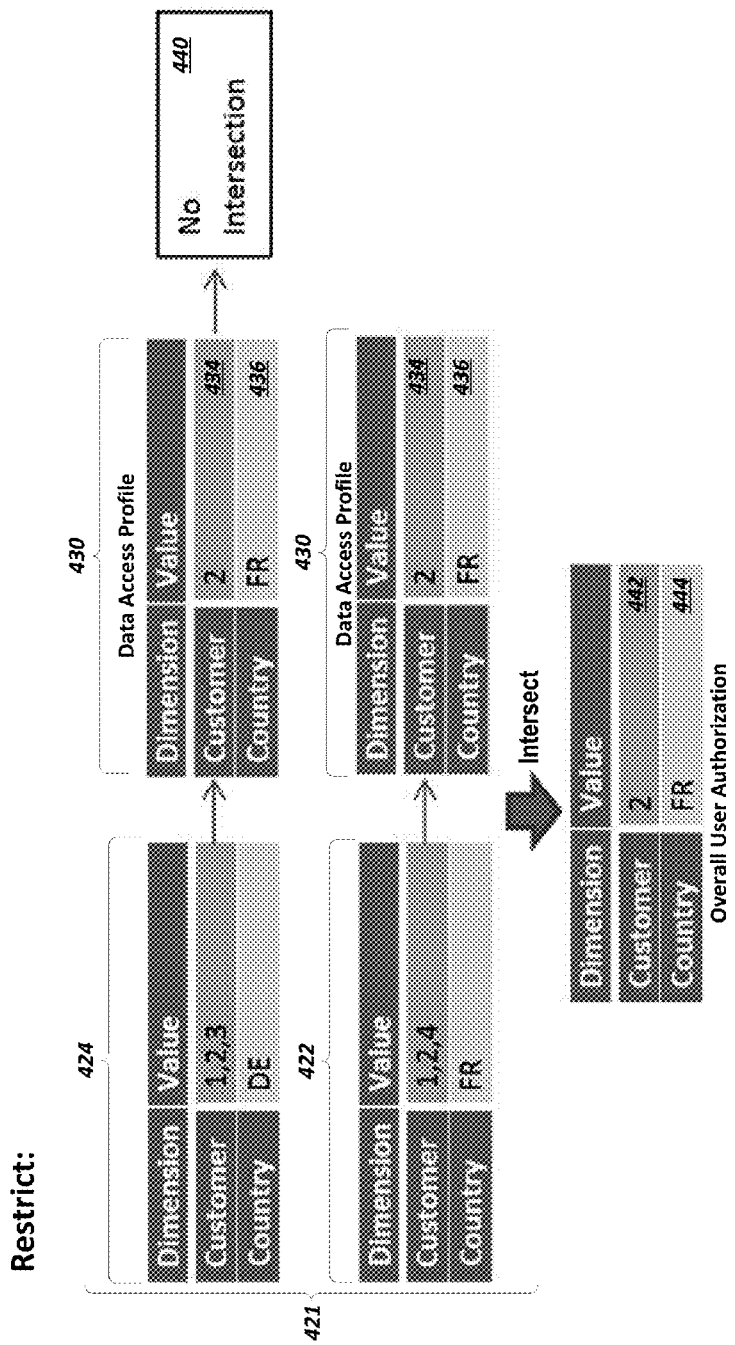
FIG. 4D is a diagram illustrating the intersecting of an enhanced authorization set with a user-based data access profile to create an overall user authorization set according to an implementation.

FIG. 4D is a diagram illustrating the intersecting of an enhanced authorization set 421 with a user-based data access profile 430 to create an overall user authorization set 432 according to an implementation. The data access profile 430 includes a customer number value of two 434 for the customer dimension and a country value of "FR" 436 for the country dimension. Since the authorization set 421 includes multiple authorizations (e.g., the authorization 424 and the merged authorization 422), intersecting can include performing a first intersection of the data access profile 430 with the authorization 424 and a second intersection of the data access profile 430 with the merged authorization 422.

The authorization 424 and the data access profile 430 differ both in values for the country dimension (e.g., "DE" vs. "FR") and the customer dimension (e.g., "1, 2, 3" vs. "2"), respectively. Accordingly, the intersection operation between the authorization 424 and the data access profile 430 yields an empty result (e.g., as illustrated by a "no intersection" note 440).

The overall user authorization set 432 is a result of the intersection of the merged authorization 422 and the data access profile 430. The overall user authorization set 432 includes a customer value of two 442 for the customer dimension and a country value of "FR" 444 for the country dimension (e.g., with two and "FR" being a customer value and a country value in common, respectively, between the merged authorization 432 and the data access profile 430).

Referring again to FIG. 3, at 336, the OLAP system 306 sends a request to an authorization check component 338 to perform an authority check to determine whether the user is authorized to access data associated with the query. The request sent to the authorization check component 338 can include the authorization buffer, for example. At 340, the authorization check component 338 responds as to whether the user is authorized to access the data associated with the query. When the user is authorized to access the data associated with the query, the OLAP system 306, at 342, performs the query and provides a query result to the user device 302. When the user is not authorized to access the data associated with the query, the OLAP system 306, at 342, provides an error message (for example) to the user device 304.

FIG. 5 is a block diagram 500 of an exemplary computer 502 used in the EDCS 100 according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 502 may comprise a computer that includes an input device, such as a keypad, keyboard, touch screen, or other device that can accept user information, and an output device that conveys information associated with the operation of the computer 502, including digital data, visual and/or audio information, or a GUI.

The computer 502 can process for/serve as a client (e.g., client devices associated with the data warehouse user 101, the central IT user 102, the local IT user 103), the UI layer 104 (or one or more subcomponents), or the EDW system 106 (or one or more subcomponents), and/or any other component of the EDCS 100 (whether or not illustrated). The illustrated computer 502 is communicably coupled with the network 130. In some implementations, one or more components of the computer 502 may be configured to operate within a cloud-computing-based environment.

At a high level, the computer 502 is an electronic computing device operable to receive, transmit, process, store, or manage data and information associated with the EDCS 100. According to some implementations, the computer 502 may also include or be communicably coupled with a cloud-computing server, application server, e-mail server, web server, caching server, streaming data server, business intelligence (BI) server, and/or other server.

The computer 502 can receive requests over network 130 from a client application (e.g., a mobile UI and/or web-based application UI executing on another computer 502 in use by a data warehouse user 101, the central IT user 102, or the local IT user 103) and responding to the received requests by processing the said requests in an appropriate software application. In addition, requests may also be sent to the computer 502 from internal users (e.g., from a command console or by other appropriate access method), external or third-parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an API 512 and/or a service layer 513. The API 512 may include specifications for routines, data structures, and object classes. The API 512 may be either computer-language independent or dependent and refer to a complete interface, a single function, or even a set of APIs. The service layer 513 provides software services to the computer 502 and/or the EDCS 100. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 and/or the service layer 513 as stand-alone components in relation to other components of the computer 502 and/or EDCS 100. Moreover, any or all parts of the API 512 and/or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or EDCS 100. The interface 504 is used by the computer 502 for communicating with other systems in a distributed environment—including within the EDCS 100—connected to the network 530 (whether illustrated or not). Generally, the interface 504 comprises logic encoded in software and/or hardware in a suitable combination and operable to communicate with the network 530. More specifically, the interface 504 may comprise software supporting one or more communication protocols associated with communications such that the network 530 or interface's hardware is operable to communicate physical signals within and outside of the illustrated EDCS 100.

The computer 502 includes a processor 505. Although illustrated as a single processor 505 in FIG. 5, two or more processors may be used according to particular needs, desires, or particular implementations of the computer 502 and/or the EDCS 100. Generally, the processor 505 executes instructions and manipulates data to perform the operations of the computer 502. Specifically, the processor 505 executes the functionality required for integrating authorizations.

The computer 502 also includes a database 506 and memory 508 that hold data for the computer 502 and/or other components of the EDCS 100. Although illustrated as a single database 506 and memory 508 in FIG. 5, two or more databases 508 and memories 508 may be used according to particular needs, desires, or particular implementations of the computer 502 and/or the EDCS 100. While database 508 and memory 508 are illustrated as integral components of the computer 502, in alternative implementations, the database 506 and memory 508 can be external to the computer 502 and/or the EDCS 100. In some implementations, the database can be a conventional database or an in-memory database, or a mix of both. In some implementations, the database 506 and memory 508 can be combined into one component.

The application 507 is an algorithmic software engine providing functionality according to particular needs, desires, or particular implementations of the computer 502 and/or the EDCS 100, particularly with respect to functionalities required for providing the described authorization integration. For example, application 507 can serve as the UI layer 104 (or one or more subcomponents), the authorization engine 116, and/or any other component of the EDCS 100 (whether or not illustrated). Further, although illustrated as a single application 507, the application 507 may be implemented as multiple applications 507 on the computer 502. In addition, although illustrated as integral to the computer 502, in alternative implementations, the application 507 can be external to the computer 502 and/or the EDCS 100.

There may be any number of computers 502 associated with, or external to, the EDCS 100 and communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   reading, by a hardware processor, enterprise data warehouse (EDW) authorizations for a user from an authorization database in response to a query generated by the user for EDW data, the EDW authorizations specifying one or more data dimensions and one or more values for each specified data dimension;
   responsive to a determination that the user is assigned to an environment, reading a set of environment authorizations from a business planning and consolidation (BPC) system, wherein the set of environment authorizations are specific to an environment used by a line of business and that are to be applied to a user associated with the line of business;
   enhancing the EDW authorizations for the user with the environment authorizations read from the BPC system to create a new authorization set, wherein the enhancement includes a merged authorization formed from the EDW authorizations and the environment authorizations to allow subsequent processing of one merged authorization rather than two separate authorizations, and wherein the merging is performed when the EDW authorizations and the environment authorizations have the same data dimensions and the same values for corresponding dimensions except for one dimension that has different values between the EDW authorizations and the environment authorizations;
   reading a user-based data access profile (DAP) from the BPC; and
   intersecting the new authorization set with the DAP to create an overall user authorization set.

2. The method of claim 1, comprising receiving a request to fill an authentication buffer in response to the query.

3. The method of claim 1, wherein enhancing the EDW authorizations for the user comprises a union of the EDW authorizations and the environment authorizations.

4. The method of claim 1, comprising performing an authority check for the user with respect to the query using the overall user authorization set.

5. The method of claim 1, wherein the EDW and environment authorizations are established by a centralized information technology group.

6. The method of claim 1, wherein the DAPs are established by a local information technology group for a particular line-of-business.

7. The method of claim 1, wherein the DAPs restrict the new authorization set.

8. A non-transitory, computer-readable medium storing computer-readable instructions executable by a computer and configured to:
   read enterprise data warehouse (EDW) authorizations for a user from an authorization database in response to a query generated by the user for EDW data, the EDW authorizations specifying one or more data dimensions and one or more values for each specified data dimension;
   responsive to a determination that the user is assigned to an environment, read a set of environment authorizations from a business planning and consolidation (BPC) system, wherein the set of environment authorizations are specific to an environment used by a line of business and that are to be applied to a user associated with the line of business;
   enhance the EDW authorizations for the user with the environment authorizations read from the BPC system to create a new authorization set, wherein the enhancement includes a merged authorization formed from the EDW authorizations and the environment authorizations to allow subsequent processing of one merged authorization rather than two separate authorizations, and wherein the merging is performed when the EDW authorizations and the environment authorizations have the same data dimensions and the same values for corresponding dimensions except for one dimension that has different values between the EDW authorizations and the environment authorizations;
   read a user-based data access profile (DAP) from the BPC; and
   intersect the new authorization set with the DAP to create an overall user authorization set.

9. The medium of claim 8, comprising receiving a request to fill an authentication buffer in response to the query.

10. The medium of claim 8, wherein enhancing the EDW authorizations for the user comprises a union of the EDW authorizations and the environment authorizations.

11. The medium of claim 8, comprising performing an authority check for the user with respect to the query using the overall user authorization set.

12. The medium of claim 8, wherein the EDW and environment authorizations are established by a centralized information technology group.

13. The medium of claim 8, wherein the DAPs are established by a local information technology group for a particular line-of-business.

14. A system, comprising:
- a memory;
- at least one hardware processor interoperably coupled with the memory and configured to:
  - read enterprise data warehouse (EDW) authorizations for a user from an authorization database in response to a query generated by the user for EDW data, the EDW authorizations specifying one or more data dimensions and one or more values for each specified data dimension;
  - responsive to a determination that the user is assigned to an environment, read a set of environment authorizations from a business planning and consolidation (BPC) system, wherein the set of environment authorizations are specific to an environment used by a line of business and that are to be applied to a user associated with the line of business;
  - enhance the EDW authorizations for the user with the environment authorizations read from the BPC system to create a new authorization set, wherein the enhancement includes a merged authorization formed from the EDW authorizations and the environment authorizations to allow subsequent processing of one merged authorization rather than two separate authorizations, and wherein the merging is performed when the EDW authorizations and the environment authorizations have the same data dimensions and the same values for corresponding dimensions except for one dimension that has different values between the EDW authorizations and the environment authorizations;
  - read a user-based data access profile (DAP) from the BPC; and
  - intersect the new authorization set with the DAP to create an overall user authorization set.

15. The system of claim 14, comprising receiving a request to fill an authentication buffer in response to the query.

16. The system of claim 14, wherein enhancing the EDW authorizations for the user comprises a union of the EDW authorizations and the environment authorizations.

17. The system of claim 14, comprising performing an authority check for the user with respect to the query using the overall user authorization set.

18. The system of claim 14, wherein the EDW and environment authorizations are established by a centralized information technology group.

19. The system of claim 14, wherein the DAPs are established by a local information technology group for a particular line-of-business.

20. The system of claim 14, wherein the DAPs restrict the new authorization set.

* * * * *